(12) United States Patent
Höjer

(10) Patent No.: US 11,731,845 B2
(45) Date of Patent: Aug. 22, 2023

(54) LOADING DEVICE FOR PARTICULATE MATERIAL

(71) Applicant: IMERTECH SAS, Paris (FR)

(72) Inventor: Thomas Höjer, Askim (SE)

(73) Assignee: IMERTECH SAS, Paris (FR)

( * ) Notice: Subject to any disclaimer, the term of this patent is extended or adjusted under 35 U.S.C. 154(b) by 371 days.

(21) Appl. No.: 17/047,094

(22) PCT Filed: Apr. 9, 2019

(86) PCT No.: PCT/EP2019/058922
§ 371 (c)(1),
(2) Date: Oct. 13, 2020

(87) PCT Pub. No.: WO2019/197390
PCT Pub. Date: Oct. 17, 2019

(65) Prior Publication Data
US 2021/0155425 A1    May 27, 2021

(30) Foreign Application Priority Data

Apr. 13, 2018 (EP) .................................... 18167205

(51) Int. Cl.
| | |
|---|---|
| *B65G 69/18* | (2006.01) |
| *B08B 15/00* | (2006.01) |
| *B28C 5/08* | (2006.01) |
| *B65B 1/16* | (2006.01) |
| *B65B 69/00* | (2006.01) |

(52) U.S. Cl.
CPC ............ *B65G 69/182* (2013.01); *B08B 15/00* (2013.01); *B28C 5/0818* (2013.01); *B65B 1/16* (2013.01); *B65B 69/0008* (2013.01)

(58) Field of Classification Search
CPC .... B65G 69/18; B65G 69/181; B65G 69/182; B08B 15/00; B28C 5/0818; B65B 69/0008
See application file for complete search history.

(56) References Cited

U.S. PATENT DOCUMENTS

| | | | |
|---|---|---|---|
| 3,248,018 A * | 4/1966 | Fleischman | .......... B65G 69/181 222/196 |
| 3,799,223 A * | 3/1974 | Feneziani | .............. B67D 7/005 285/302 |

(Continued)

FOREIGN PATENT DOCUMENTS

| | | |
|---|---|---|
| DE | 1244062 B1 | 7/1967 |
| DE | 3816507 C1 | 10/1989 |

(Continued)

OTHER PUBLICATIONS

International Search Report and Written Opinion dated May 6, 2019, in International Application No. PCT/EP2019/058922.

*Primary Examiner* — Nicolas A Arnett
(74) *Attorney, Agent, or Firm* — Finnegan, Henderson, Farabow, Garrett & Dunner, LLP

(57) ABSTRACT

The present invention relates to a loading device for loading particulate material, comprising a body with a first opening and a second opening, wherein a gasket is arranged at the first opening. The present invention also relates to a mixing device with a loading device according to the invention and a method of loading particulate material using the loading device according to the invention.

13 Claims, 2 Drawing Sheets

(56) References Cited

U.S. PATENT DOCUMENTS

| | | | | |
|---|---|---|---|---|
| 5,405,049 | A | * | 4/1995 | Ricciardi ............... B65G 65/46 222/196 |
| 6,019,147 | A | * | 2/2000 | Prescott ............... B65G 69/181 141/263 |
| 6,293,318 | B1 | * | 9/2001 | Schmidt ............. B65B 69/0008 141/330 |
| 6,491,070 | B1 | * | 12/2002 | Espina Frutos ...... B65G 69/182 141/54 |
| 7,231,947 | B2 | * | 6/2007 | Boroch .................... B65B 1/16 141/315 |
| 9,551,505 | B2 | * | 1/2017 | Sandman ................ F16L 25/08 |
| 9,943,982 | B2 | * | 4/2018 | Connard, III ......... B08B 17/025 |
| 10,016,712 | B2 | * | 7/2018 | Guth .................... B01D 46/521 |
| 10,029,810 | B2 | * | 7/2018 | Wegman .................. B65B 1/08 |
| 2003/0006248 | A1 | * | 1/2003 | Gill ......................... B65B 55/24 222/181.2 |
| 2006/0028907 | A1 | * | 2/2006 | Barker ............... A61B 17/8822 366/139 |
| 2011/0100397 | A1 | * | 5/2011 | Rolin ................... B65G 69/182 15/345 |
| 2014/0192611 | A1 | * | 7/2014 | Sasaki ................ B01F 35/7174 366/139 |

FOREIGN PATENT DOCUMENTS

| | | |
|---|---|---|
| DE | 199 01 904 A1 | 7/2000 |
| EP | 0138148 A1 | 4/1985 |
| EP | 1129968 A1 | 9/2001 |
| FR | 2946904 A1 | 12/2010 |
| JP | 62-165201 | 10/1987 |
| JP | 2001-72027 A | 3/2001 |
| JP | 2001-51786 A | 10/2001 |
| JP | 2002-307424 A | 10/2002 |
| JP | 2010-184373 A | 8/2010 |
| KR | 10-1845772 | 4/2018 |
| WO | WO 98/43902 | 10/1998 |

* cited by examiner

LOADING DEVICE FOR PARTICULATE MATERIAL

CLAIM FOR PRIORITY

This application is a U.S. national phase entry under 35 U.S.C. § 371 from PCT International Application No. PCT/EP2019/058922, filed Apr. 9, 2019, which claims the benefit of priority of European Patent Application No. 18167205.6, filed Apr. 13, 2018, from both of which this application claims priority and both of which are incorporated herein by reference.

FIELD OF THE INVENTION

The present invention is directed to a loading device for loading particulate material, comprising a body with a first opening and a second opening, wherein a gasket is arranged at the first opening. The present invention also directed to a mixing device with a loading device according to the invention and a method of loading particulate material using the loading device according to the invention.

BACKGROUND OF THE INVENTION

Concrete is used in a wide range of applications, particularly in the building trade and is typically made by mixing water with particulate material such as cement powder and aggregates. Concrete is routinely mixed on site in large mixers directly before use. Mixing concrete generally involves particulate material being transferred from a container, such as a bag or sack, to a mixer. This transfer of the particulate material on site in this way poses certain challenges.

When transferring the particulate material into the mixer, bags or sacks containing the particulate material are required to be maneuvered to the mixer and opened to release the contents. Current methods of transferring the particulate material inevitably generate airborne particulate material (dust), which leads to loss of material and pollution of the surrounding environment. Transferring particulate material in this way may also cause the operator to inhale the dust.

It is therefore desirable to provide a way to address one or more of the known drawbacks when transferring particulate material.

SUMMARY OF THE INVENTION

The present invention is defined in the appended claims.

In accordance with a first aspect, there is provided a loading device for loading particulate material, comprising a body with a first opening and a second opening, wherein a gasket is arranged at the first opening.

In accordance with a second aspect, there is provided a mixing device with a loading device according to the first aspect.

In accordance with a third aspect, there is provided a method of loading particulate material comprising the steps of:
a) placing a first container with particulate material on the first opening of the loading device according to the first aspect; and
b) transferring the particulate material into a second container attached to the second opening of the loading device.

Certain embodiments of the present invention may provide one or more of the following advantages when transferring the particulate material:
desired efficiency;
desired ease of use;
desired safety;
desired containment of the particulate material;
desired environmental impact.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

BRIEF DESCRIPTION OF THE DRAWINGS

The invention will further be illustrated by reference to the following figures.

Figure 1:
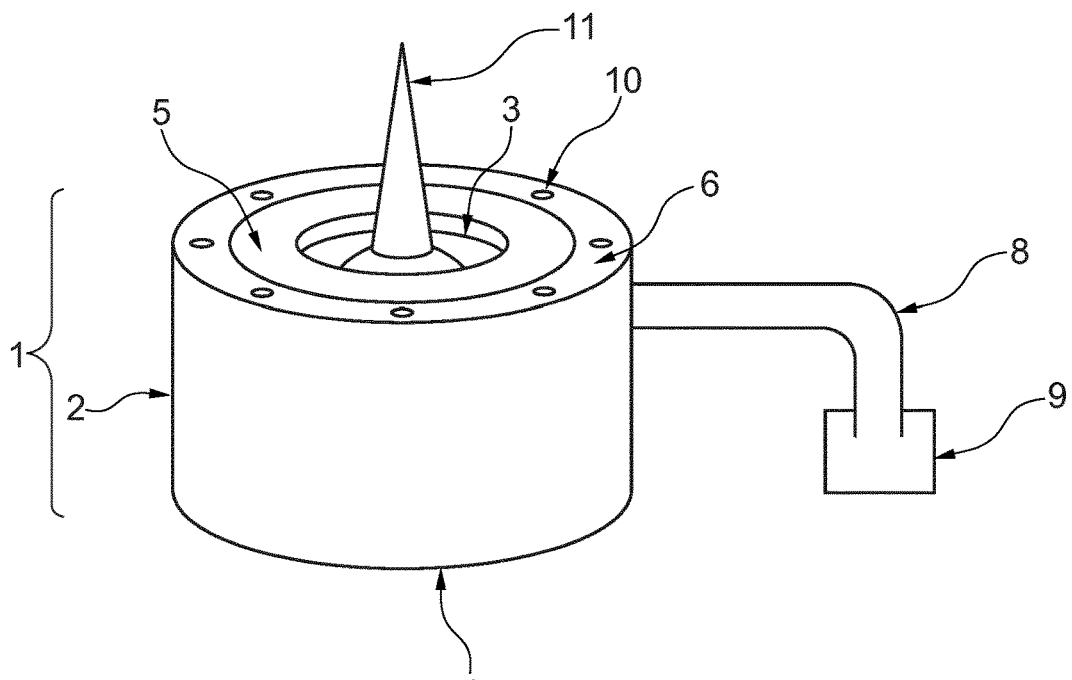
FIG. 1 depicts an example of a loading device according to the present invention.
Figure 2:
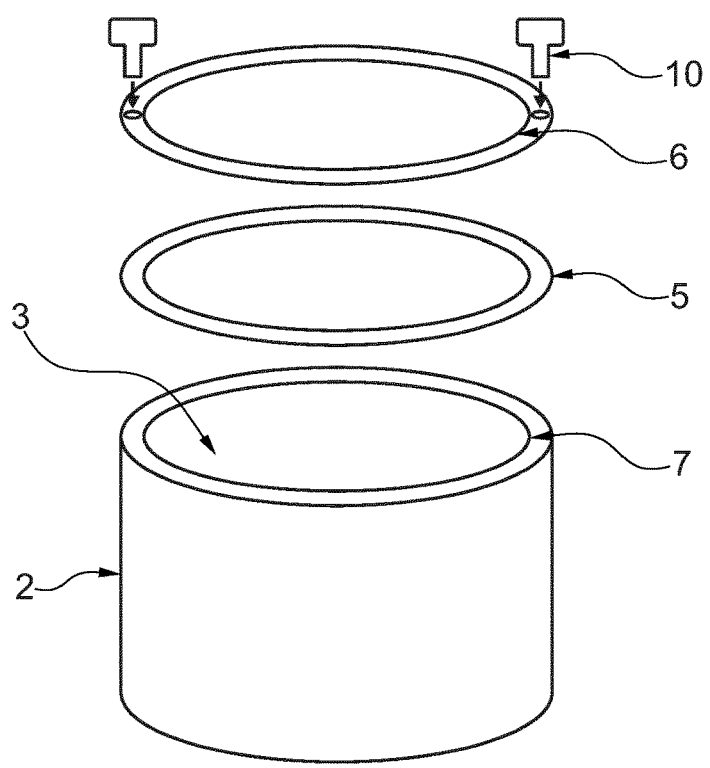
FIG. 2 depicts the assembly of an element, gasket and body via a lip on the body.
Figure 3:
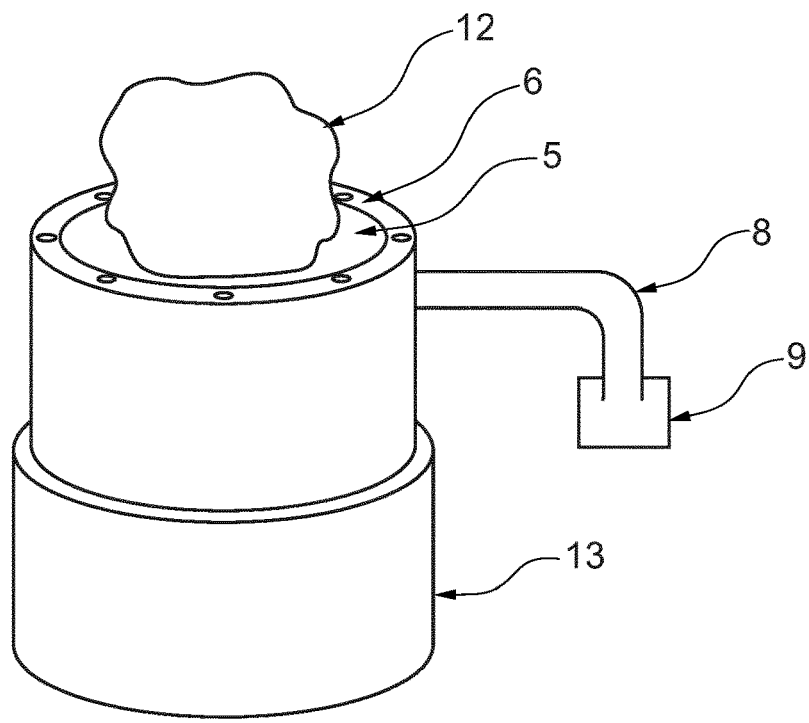
FIG. 3 depicts the loading device with a first container at the first opening and a second container at the second opening
Figure 4:
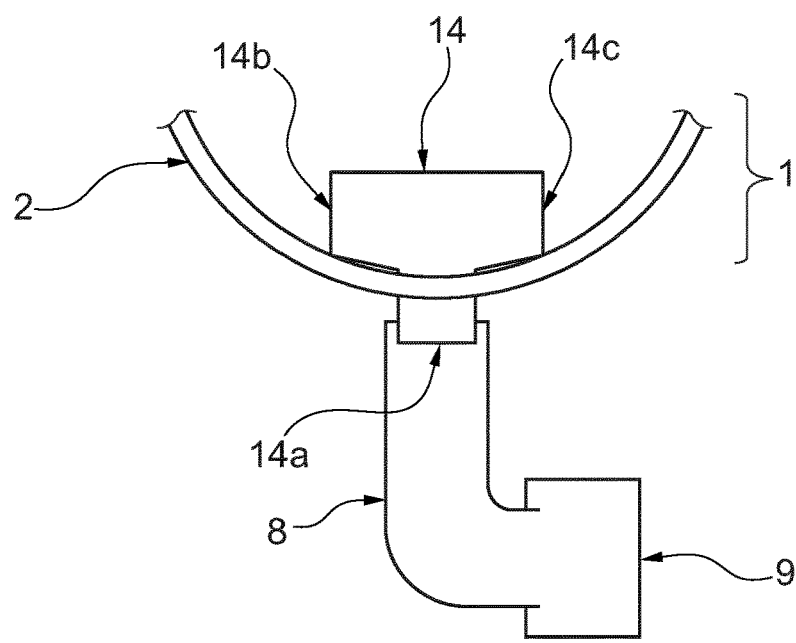
FIG. 4 depicts a cross-section of the loading device and T-joint attached to the extraction pipe.

It is understood that the following description and references to the figures concern exemplary embodiments of the present invention and shall not be limiting the scope of the claims.

DETAILED DESCRIPTION

The present invention provides a loading device for loading particulate material according to the appended claims. The loading device comprises a body with a first opening and a second opening, wherein a gasket is arranged at the first opening. The loading device aids the transfer of particulate material from a first container to a second container. For example, the loading device may be arranged between the first container and the second container. In certain embodiments, the loading device allows a first container with particulate material to be placed at the first opening and a second container to be placed at the second opening. The particulate material in the first container may then be transferred to the second container via the loading device.

In certain embodiments the particulate matter may be selected from lime silicate, calcium silicate, Portland cement, sand, silica, alumina, magnesia, calcium oxide zirconia, carbides, nitrides, borides, silicates, graphite, amorphous carbon, silicon carbide, aluminium silicates, chromium oxide, or combinations thereof. In certain embodiments the particulate matter may have a mean particle size $d_{50}$ of less than 5 µm, or less than 4.5 µm, or less than 4.0 µm, or less than 3.5 µm, or less than 3.0 µm, or less than 2.5 µm, or less than 2.0 µm, or less than 1.5 µm. Particle size may be measured by any appropriate measurement technique now known to the skilled artisan or hereafter discovered. Unless otherwise stated, particle size and particle size properties, such as particle size distribution ("psd"), are measured using a Leeds and Northrup Microtrac X100 laser particle size analyzer (Leeds and Northrup, North Wales, Pa., USA), which can determine particle size distribution over a particle size range from 0.12 µm to 704 µm. The size of a given particle is expressed in terms of the diameter of a sphere of equivalent diameter that sediments through the suspension, also known as an equivalent spherical diameter or "esd." The median particle size, or $d_{50}$ value, is the value at which 50% by weight of the particles have an esd less than that $d_{50}$ value.

In certain embodiments the first container may be a flexible container such as a bag. The bag may be made of plastic or cloth. The bag may be open on one side or sealed on all sides. The first container may vary in size. For example, the surface of the first container placed at the first opening may have a diameter of up to 900 mm, which may allow the gasket to have a tight fit preventing dust development during charging. In certain embodiments the second container may be a mixing device, such as a concrete mixing device, a shotcrete mixing device, a paddle type intensive mixer or free fall type mixer. In certain embodiments, a mixing device is fixable to the body around the second opening. The mixing device may be secured to the second opening by nuts and bolts or screws. In certain embodiments, the mixing device is detachable from the loading device. In this way, a single loading device may be used with several different mixing devices.

In certain embodiments the first opening is in a first plane and the second opening is in a second plane, wherein the first plane and the second plane may be at an angle of less than 25° to one another and/or parallel. In certain embodiments, the surface area and/or the circumference of the first opening may be smaller, of equal size, or larger than second opening. The first opening and second opening may be arranged to allow for a free flow of the particulate material from the first container to the second container. The shape of the first and second opening may, independently from one another, be a circle, an oval, or a polygon, such as a triangle, a square, a rectangle, a pentagon, a hexagon, a heptagon, an octagon, a nonagon, a decagon, a hendecagon or a dodecagon.

In certain embodiments, the gasket arranged at the first opening may be flexible. The gasket may be attached directly to the body to form the boundary of the first opening. In certain embodiments, the gasket fills a space between the body and the first container at the first opening. The gasket may form a seal between the body and the first container. The flexible properties of the gasket are considered to be suitable to accommodate first containers of various sizes and/or shapes. In certain embodiments the gasket comprises rubber, silicone, cork, neoprene, nitrile rubber and/or polytetrafluoroethylene. In certain embodiments, the gasket may be a ring with an inner radius of about 150 mm, or about 200 mm, or about 250 mm, or about 300 mm. In certain embodiments, the gasket may be a ring with an inner diameter of about 500 mm. In certain embodiments, the gasket may be a ring with an outer radius of about 250 mm, or about 300 mm, or about 350 mm. The gasket may have an outer radius with the same dimensions as the radius of the body of the loading device. In certain embodiments, the gasket may have a thickness of about 1 mm, or about 2 mm, or about 3 mm, or about 4 mm or about 5 mm.

In certain embodiments, the body may be cylindrical or conical. In certain embodiments the body comprises aluminium, wrought iron, cast iron, steel, stainless steel, carbon fibre, fibre reinforced plastic and/or timber. In certain embodiments, the body has a height, i.e. the shortest distance between the first opening and the second opening, of about 300 mm, or about 350 mm, or about 400 mm, or about 450 mm, or about 500 mm, or about 550 mm or about 600 mm.

In certain embodiments, the first opening comprises a further element, wherein the gasket is arranged between the body and the element. In certain embodiments the body comprises a lip, which forms a boundary around the first opening and the element may be attached to the body via the lip. For example, the element is attached to the lip of the body with nuts and bolts or with screws. In certain examples, the element and lip are rings and the element has an outer radius that is the same, or up to 5 mm, smaller or larger, or up to 10 mm smaller or larger than the outer radius of the lip. In certain examples, the element has an inner radius that is the same, or up to 5 mm smaller or larger, or up to 10 mm smaller or larger than the inner radius of the lip. In certain embodiments the gasket protrudes from between the body and the element into the first opening. In certain embodiments an area of at least 80 mm$^2$, or of at least 90 mm$^2$, or of at least 100 mm$^2$, or of at least 110 mm$^2$, or of at least 120 mm$^2$, of the gasket protrudes from between the body and the element into the first opening.

In certain embodiments, the body is attached to an exhaust pipe. Without being bound to theory, it is considered that the airborne particulate material is contained in the loading device during transfer of the particulate material from a first container to a second container. This may be assisted by the formation of a seal formed at the first opening between the first container and the gasket. By attaching an exhaust pipe to the body the airborne particulate material may be displaced to a different location.

In certain embodiments, the body of the loading device is attached to an extraction unit via the exhaust pipe. The exhaust pipe may have a length of about 1 meter, or about 2 meters, or about 3 meters, or about 4 meters, or about 5 meters, or about 7 meters, or about 10 meters, or about 15 meters, or about 20 meters, or about 30 meters. In certain embodiments the extraction unit comprises a dust filter. In certain embodiments the extraction unit creates a vacuum pressure of at least 10 kPa, or at least 15 kPa, or at least 20 kPa, or at least 25 kPa aiding the displacement of the airborne particulate material to a different location.

In certain embodiments, the exhaust pipe is attached to a T-joint under the lip of the body. In certain embodiments, the T-joint under the lip of the body is in the top half of the body. For example, the T-joint under the lip of the body is in the top third of the body, or in the top quarter of the body. In certain embodiments, the T-joint surface closest to the lip is positioned 20 mm below the lip, or 25 mm below the lip, or 30 mm below the lip, or 35 mm below the lip, or 40 mm below the lip, or 45 mm below the lip, or 50 mm below the lip, or 55 mm below the lip, or 60 mm below the lip, or 65 mm below the lip, or 70 mm below the lip, or 75 mm below the lip.

A T-joint as disclosed herein has a bottom section with one opening, which is attached to and is perpendicular to the top section of the T-joint with two openings. The two openings of the top section of the T-joint are connected to one another end-to-end. The top section of the T-joint is position inside the loading device. In certain embodiments, the two openings of the top section of the T-joint are directed towards the sidewall of the body. In certain embodiments, neither of the two openings of the top section of the T-joint are directed towards the centre of the loading device. In certain embodiment the top section and the bottom section of the T-joint are cylindrical and/or conical.

In certain embodiments the T-joint is attached to the body of the loading device with the bottom opening of the T-joint outside the body and the top openings of the T-joint inside the body. In certain embodiments the bottom opening of the T-joint is attached to the exhaust pipe with the two openings of the top section of the T-joint inside the body of the loading device. In certain embodiments the top section of the T-joint is secured to the body of the loading device by welding, screwing or the use of nuts and bolts. In certain embodiments, the bottom section of the T-joint is attached to an exhaust pipe using clamp device using, for example, an excenter lock or screw lock.

In certain embodiments the bottom opening of the T-joint has a diameter of about 90 mm, or about 100 mm, or about 110 mm, or about 120 mm, or about 130 mm, or about 140 mm, or about 150 mm, or about 160 mm, or about 170 mm, or about 180 mm. In certain embodiments the top openings of the T-joint have, independently from one another, a diameter of about 90 mm, or about 100 mm, or about 110 mm, or about 120 mm, or about 130 mm, or about 140 mm, or about 150 mm, or about 160 mm, or about 170 mm, or about 180 mm. In certain embodiments the bottom section of the T-joint protruding perpendicular from the top section of the T-joint has a length of about 140 mm, or about 130 mm, or about 120 mm, or about 110 mm, or about 100 mm, or about 90 mm, or about 80 mm. In certain embodiments the distance between the two openings of the top section of the T-joint is about 350 mm, or about 340 mm, or about 330 mm, or about 320 mm, or about 310 mm, or about 300 mm, or about 290 mm, or about 280 mm, or about 270 mm, or about 260 mm, or about 250 mm, or about 240 mm. In certain embodiments, the top openings both have a diameter of about 160 mm, the bottom opening has a diameter of about 100 mm, the bottom protruding section has a length of about 140 mm and the distance between the two openings of the top section of the T-joint is about 320 mm.

In certain examples it has been observed that the T-joint predominantly allows fine airborne particles to be evacuated via the exhaust pipe. Without being bound by theory it is considered that the shape and positioning of the T-joint allows fine airborne dust particles to be evacuated, leaving the larger, heavier particles in the loading device. In certain embodiments, particulate material with a particle size of less than 100 μm, or less than 90 μm, or less than 80 μm, or less than 70 μm, or less than 60 μm, or less than 50 μm, or less than 40 μm are evacuated via the T-joint and exhaust pipe. In certain embodiments particulate material with a particle size of more than 100 μm remain in the loading device. In certain embodiments the T-joint is free from filters.

In certain embodiments the top section of the T-joint is located inside the body of the loading device under the lip in the top half of the body, wherein the top section of the T-joint is inside the loading device and the two openings of the top section of the T-joint are directed towards the sidewall of the body.

In certain embodiments, the particulate material collected in the extraction unit is recycled.

In certain embodiments, a spike protrudes through the first opening. The spike may be attached to the body at two or more points. In certain examples the spike may assist the ease of transfer of the particulate material, by allowing the operator to place an unopened first container directly onto the first opening of the loading device. In certain examples, the spike pierces the first container upon its placement at the first opening causing the contents to enter the loading device. The first container may be positioned onto the first opening of the loading device with the aid of a forklift truck.

Once the first container is placed over the first opening, the position and shape of the loading device may also block convenient access to the first container, thereby discouraging the operator to insert a hand and/or an arm into the loading device. This may serve to protect the operator from potential injuries that may be sustained by inserting a hand and/or an arm into the loading device and/or second container.

In certain embodiments, the loading device may have one or more of the following effects:

- containment of airborne particulate material;
- safe transfer of particulate material from a first container to a second container;
- more environmentally friendly use of particulate material;
- a reusable device;
- a flexible device able to adapt to different first containers and/or second containers with various sizes and shapes
- prevent hand and arm pinch risks;
- prevent the risk of human exposure to airborne particulate material;
- selective evacuation of airborne particulate material.

Examples

FIG. 1 shows an example of a loading device 1, wherein the body 2 has a first opening 3 and a second opening 4 (not shown). The body is attached to the element 6 with nuts 10 and bolts (not shown), between which a gasket 3 is secured.

The example depicted by FIG. 1 furthermore comprises an exhaust pipe 8 and an extraction unit 9, wherein the body 2 is attached to the extraction unit 9 via the exhaust pipe 8. A spike 11 is also present in the example of FIG. 1, which protrudes out of the first opening 3.

FIG. 2 shows an example of the assembly of the element 6, gasket 5 and body 2. The element 6 is attached to the body 2 via a lip 7 with nuts 10 and bolts (not shown), securing the gasket 5 therebetween.

FIG. 3 shows an example of a loading device 1, wherein a first container 12 is placed at the first opening (not shown) and a second container 13 is attached to the second opening (not shown) of the loading device.

FIG. 4 shows a part of the cross-section of the loading device 1 from above, wherein the T-joint 14 is attached to the loading device 1 and exhaust pipe 8. The top section of the T-joint 14 is inside the loading device 1 and attached to the body 2. The two openings of the top section of the T-joint, 14*b* and 14*c*, are orientated away from the centre of the loading device 1. The bottom opening of the T-joint, 14*a*, is attached to the exhaust pipe 8.

For the avoidance of numbered paragraph doubt, the present application is directed to subject-matter described in the following numbered paragraphs.

1. A loading device (1) for loading particulate material, comprising a body (2) with a first opening (3) and a second opening (4), wherein a gasket (5) is arranged at the first opening (3).
2. The loading device (1) according to numbered paragraph 1, further comprising an element (6), wherein the gasket (5) is arranged between the body (2) and the element (6).
3. The loading device (1) according to numbered paragraph 1 or numbered paragraph 2, wherein the body (2) comprises a lip (7), which forms the boundary around the first opening (3).
4. The loading device (1) according to any preceding numbered paragraph, wherein the element (6) is attached to the body (2), preferably via the lip (7).
5. The loading device (1) according to any preceding numbered paragraph, wherein the gasket (5) is flexible.

6. The loading device (1) according to any preceding numbered paragraph, wherein the gasket (5) comprises rubber, silicone, cork, neoprene, nitrile rubber and/or polytetrafluoroethylene.
7. The loading device (1) according to any preceding numbered paragraph, wherein the first opening (3) is in a first plane and the second opening (4) is in a first plane, wherein the first plane and the second plane are at an angle of less than 25° to one another.
8. The loading device (1) according to any preceding numbered paragraph, wherein part of the body (2) is cylindrical or conical.
9. The loading device (1) according to any preceding numbered paragraph, wherein the body (2) comprises aluminium, wrought iron, cast iron, steel, stainless steel, carbon fibre, fibre reinforced plastic and/or timber.
10. The loading device (1) according to any preceding numbered paragraph, wherein the body (2) is attached to an exhaust pipe (8).
11. The loading device (1) according to any preceding numbered paragraph, wherein the loading device (1) is attached to an extraction unit (9) via the exhaust pipe (8).
12. The loading device (1) according to numbered paragraph 10 or numbered paragraph 11, comprising a T-joint (14) with two top openings (14b and 14c) inside the loading device (1) and the bottom opening (14a) outside the loading device (1), wherein the bottom opening (14a) is attached to the exhaust pipe (8).
13. The loading device (1) according to numbered paragraph 12, wherein the T-joint (14) is located in the top half of the body (2) under a lip (7), which forms a boundary around the first opening (3).
14. The loading device (1) according to numbered paragraph 12 or numbered paragraph 13, wherein the top section of the T-joint (14) is attached to the body (2), with the two openings (14b and 14c) directed to the sidewall of the body (2).
15. The loading device (1) according to any preceding numbered paragraph, wherein a spike (11) protrudes through the first opening (3).
16. The loading device (1) according to any preceding numbered paragraph, wherein the spike (11) is attached to the body (2).
17. The loading device (1) according to any preceding numbered paragraph, wherein a second container (12) is fixable to the body (2) around the second opening (4).
18. The loading device (1) according to numbered paragraph 17, wherein the second container (12) is a mixing device.
19. The loading device (1) according to numbered paragraph 18, wherein the mixing device is a shotcrete mixing device.
20. The loading device (1) according to any preceding numbered paragraph, wherein the particulate matter is selected from lime silicate, calcium silicate, Portland cement, sand, silica, alumina, magnesia, calcium oxide zirconia, carbides, nitrides, borides, silicates, graphite, amorphous carbon, silicon carbide, aluminium silicates, chromium oxide, or combinations thereof.
21. A mixing device with a loading device (1) according to any one of numbered paragraphs 1 to 20.
22. A method of loading particulate material comprising the steps of:
    a) placing a first container (12) with particulate material on the first opening (3) of the loading device (1) according to any one of numbered paragraphs 1 to 20; and
    b) transferring the particulate material into a second container (13) attached to the second opening (4) of the loading device.
23. The method of numbered paragraph 22, wherein the first container (13) is a bag.
24. The method of numbered paragraph 22 or numbered paragraph 23, wherein the second container (12) is a mixing device.

REFERENCE SIGNS

1. Loading device
2. Body
3. First opening
4. Second opening
5. Gasket
6. Element
7. Lip
8. Exhaust pipe
9. Extraction unit
10. Nuts and bolts
11. Spike
12. First container
13. Second container
14. T-joint (14a—bottom opening, 14b and 14c—top opening)

The invention claimed is:

1. A loading device for loading particulate material, comprising a body with a first opening and a second opening and a T-joint with two top openings inside the loading device and a bottom opening outside the loading device, wherein a gasket is arranged at the first opening, the body is attached to an exhaust pipe, and the bottom opening is attached to the exhaust pipe.

2. The loading device according to claim 1, further comprising an element, wherein the gasket is arranged between the body and the element.

3. The loading device according to claim 1, wherein the body comprises a lip, which forms the boundary around the first opening.

4. The loading device according to claim 3, wherein the element is attached to the body via the lip.

5. The loading device according to claim 1, wherein the gasket is flexible and comprises rubber, silicone, cork, neoprene, nitrile rubber and/or polytetrafluoroethylene.

6. The loading device according to claim 1, wherein the T-joint is located in the top half of the body under a lip, which forms a boundary around the first opening.

7. The loading device according to claim 1, wherein the top section of the T-joint is attached to the body, with the two openings directed to the sidewall of the body.

8. The loading device according to claim 1, wherein a spike protrudes through the first opening.

9. The loading device according to claim 1, wherein a second container is fixable to the body around the second opening.

10. The loading device according to claim 9, wherein the second container is a shotcrete mixing device.

11. The loading device according to claim 1, wherein the particulate matter is selected from lime silicate, calcium silicate, Portland cement, sand, silica, alumina, magnesia, calcium oxide zirconia, carbides, nitrides, borides, silicates, graphite, amorphous carbon, silicon carbide, aluminium silicates, chromium oxide, or combinations thereof.

12. A mixing device comprising a loading device according to claim 1.

13. A method of loading particulate material comprising:
a) placing a first container with particulate material on the first opening of the loading device according to claim 1; and
b) transferring the particulate material into a second container attached to the second opening of the loading device.

\* \* \* \* \*